(12) United States Patent
Gray

(10) Patent No.: US 7,472,268 B2
(45) Date of Patent: Dec. 30, 2008

(54) PRIVACY AND SECURITY MECHANISM FOR PRESENCE SYSTEMS WITH TUPLE SPACES

(75) Inventor: Thomas A. Gray, Carp (CA)

(73) Assignee: Mitel Networks Corporation (CA)

( * ) Notice: Subject to any disclaimer, the term of this patent is extended or adjusted under 35 U.S.C. 154(b) by 698 days.

(21) Appl. No.: 10/638,416

(22) Filed: Aug. 12, 2003

(65) Prior Publication Data
US 2004/0032940 A1 Feb. 19, 2004

(30) Foreign Application Priority Data
Aug. 12, 2002 (GB) .................................. 0218716.9

(51) Int. Cl.
H04L 9/00 (2006.01)
(52) U.S. Cl. ...................... 713/150; 713/171; 380/259; 380/277; 380/278; 705/71; 379/90.01; 379/93.01
(58) Field of Classification Search ...................... 726/2, 726/4, 14; 379/188; 713/150, 171; 380/259, 380/277, 278; 705/71
See application file for complete search history.

(56) References Cited

U.S. PATENT DOCUMENTS

| 5,937,066 | A * | 8/1999 | Gennaro et al. ............. 380/286 |
| 6,757,722 | B2 * | 6/2004 | Lonnfors et al. ............. 709/220 |
| 7,055,170 | B1 * | 5/2006 | Karmouch et al. ............. 726/2 |
| 7,187,935 | B1 * | 3/2007 | Day ........................ 455/456.2 |
| 7,248,677 | B2 * | 7/2007 | Randall et al. ........... 379/93.23 |
| 7,289,971 | B1 * | 10/2007 | O'Neil et al. .................. 705/44 |
| 7,349,935 | B2 * | 3/2008 | Atsumi et al. ................ 708/250 |
| 2002/0138747 | A1 * | 9/2002 | Clarke ......................... 713/189 |
| 2003/0037103 | A1 * | 2/2003 | Salmi et al. .................. 709/203 |
| 2004/0028197 | A1 * | 2/2004 | Gray et al. ............... 379/93.01 |

FOREIGN PATENT DOCUMENTS

| GB | 2 355 140 | | 4/2001 | |
| GB | 2355140 | A * | 4/2001 | .................... 726/2 |
| WO | 02/19612 | | 3/2002 | |
| WO | 02/47349 | | 6/2002 | |

OTHER PUBLICATIONS

M. Day and et al., "Instant Messaging/Presence Protocol Requirement—2779", Feb. 2000, The Internet Society, pp. 1-25.*
M. Day and et al., "A model for Presence and Instant Messaging—2778", Feb. 2000, The Internet Society, pp. 1-15.*
White paper "The Wirless Village initiative", copyright 2001-2002 Ericsson, Motorola and Nokia, pp. 1-12.*
3GPP TS 23. 141, "Architecture and Fuctional Description—Release 6", Jun. 2002, 3GPP Organizational Partners.*
European Search Report.

* cited by examiner

Primary Examiner—KimYen Vu
Assistant Examiner—April Y Shan

(57) ABSTRACT

A system is provided for cycling encryption keys to prevent the guessing of encrypted presence information in a shared information space. The system of the invention prevents malicious publication of presence information and ensures that only valid presence information is published to the shared information space. A malicious subscriber is prevented from knowing that he/she has been detected while a search is underway to determine his/her identity. During such a search, authorized subscribers are shifted to a new source of presence information while the malicious subscriber remains at the previous source.

2 Claims, 2 Drawing Sheets

PRIVACY AND SECURITY MECHANISM FOR PRESENCE SYSTEMS WITH TUPLE SPACES

BACKGROUND OF THE INVENTION

1. Field of the Invention

This invention relates generally to communication systems that use shared information spaces such as tuple spaces to exchange data on users, and more particularly to a system for preserving privacy and confidentiality of such user data.

2. Background of the Invention

As described in our co-pending patent application Ser. Nos. 10/631,789, 10/631,747 and 10/631,834, filed on the same date as this application and respectively entitled "System and Method for Facilitating Communication Using Presence and Communication Services"; "Generation of Availability Indicators from Call Control Policies for Presence Enabled Telephony System"; and "Context Aware Call Handling System", communication systems are being developed that are characterized by the interpretation of external events to facilitate personalized and customized services. One example of such a new application implemented service requires sharing awareness of a user's availability. Instead of controlling incoming calls and restricting access as traditional telephony does, this type of service attempts to engender useful communication by advertising the availability of potential collaborators. In order to do so, one or more ubiquitous sensors generate data regarding the user's location and activities, and apply such data to a context engine. Awareness data (that is raw data relating to the context of the user) is processed by the context engine to generate assertions that are then applied to a policy engine. The policy engine selects a call feature based on the user's context and policies. For example, a location service may report a user location as the washroom in response to which the context engine makes an 'Out of Office' assertion to a tuple space. In response to a call event such as "Incoming Call", a "Forward to Voice Mail" feature is selected based on the user's context (that is in the washroom) and policies (that If user is "Out of Office" FORWARD any "Incoming Call" to voice mail).

From the foregoing example, it is clear that presence systems operate to share information about users that the users may wish to remain confidential. There are many gradations of privacy and it is anticipated that people will expect to have the ability to share availability information with various degrees of privacy. This leads to an expectation in such systems that the user may wish to politely decline presence requests in a manner that will avoid embarrassment or political problems for the user.

A particular problem with respect to the security of presence information results from the fact that presence information has only a few values. Even strongly encrypted presence information is vulnerable since the few possible encrypted values can usually be easily guessed. In addition, malicious attackers can publish presence information that would be embarrassing to the user.

Although research has been undertaken in the area of security in tuple spaces, none of such research has directly addressed the problem of using tuple spaces for open presence applications.

SUMMARY OF THE INVENTION

According to the present invention, a system is provided for cycling encryption keys to prevent the guessing of encrypted presence information. The system of the invention prevents malicious publication of presence information and ensures that only valid presence information is published to the shared information space. A malicious subscriber is prevented from knowing that he/she has been detected while a search is underway to determine his/her identity. During such a search, authorized subscribers are shifted to a new source of presence information while the malicious subscriber remains at the previous source.

According to a first aspect of the invention, a cycling key system is provided for protecting presence information, which typically changes slowly and has a restricted set of values. The cycling key operation masks presence information in both its values and its transitioning. It is important that the transitioning of presence values is masked since it is otherwise possible for an attacker to simply observe that presence information has changed and thereby conclude that the user has changed his/her location. For example, if the attacker is a "stalker", knowing that the victim's location has changed at a time when the victim usually returns home can be dangerous. Additionally, the system according to the present invention prevents guessing of the encrypted representations of presence information, which is a problem due to the limited number of values it can take, by changing keys at random intervals not coincident with a change in value. This hides both the transitioning and addresses the limited representation problem in a robust manner.

According to a second aspect of the invention, multiple sites of presence information are provided which can be used for varying degrees of privacy, creating spoofing presence sites to foil attackers, and politely refusing service.

BRIEF DESCRIPTION OF THE DRAWINGS

A detailed description of the invention is set forth herein below, with reference to the following drawings in which.

DETAILED DESCRIPTION OF THE PREFERRED EMBODIMENT

Before discussing the invention in detail, a brief introduction is set forth below of the basic structure and operation of a tuple space.

A tuple is a set of type/value ordered pairs called ingles. Each ingle consists of a type (e.g. Name) and a value (e.g. John Doe). Thus, a tuple which describes an employee for a company could, for example, be:

{:name John Doe :age 37 :employee number 12345 :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any one or more fields may be replaced by a '?', which indicates a 'don't care' condition. Tuple spaces are set up to match tuples with anti-tuples that agree in all fields except for the one(s) indicated by the ? query. Thus the anti tuple:

{:name ? :age 37 :employee_number ?:start_date ?:position T12} would return the tuples for all employees of position T12 who are 37 years old.

Operations on the tuple space include:

Poke—place a tuple in the tuple space. Duration may be specified as to how long the tuple should remain in the space. This may be any period up to indefinite.

Peek—query the tuple space with an anti-tuple. This query may be specified to last for any period up to indefinite. Copies of matching tuples are returned through the interface and the tuples remain in the tuple space.

Pick—query the tuple space with an anti-tuple. This query may be specified to last for any period up to indefinite. Copies of matching tuples are returned through the interface and the tuples are removed from the tuple space.

Cancel—with the specified anti-tuple. All matching anti-tuples are removed from the tuple space. Tuples themselves may be removed directly by an appropriate pick request.

Additional operations may be provided such as disclosed in applicant's co-pending UK patent application No. 0200745.8 filed Jan. 14, 2002 entitled 'Tuple Space Operations for Fine Grained Control'.

Figure 1:
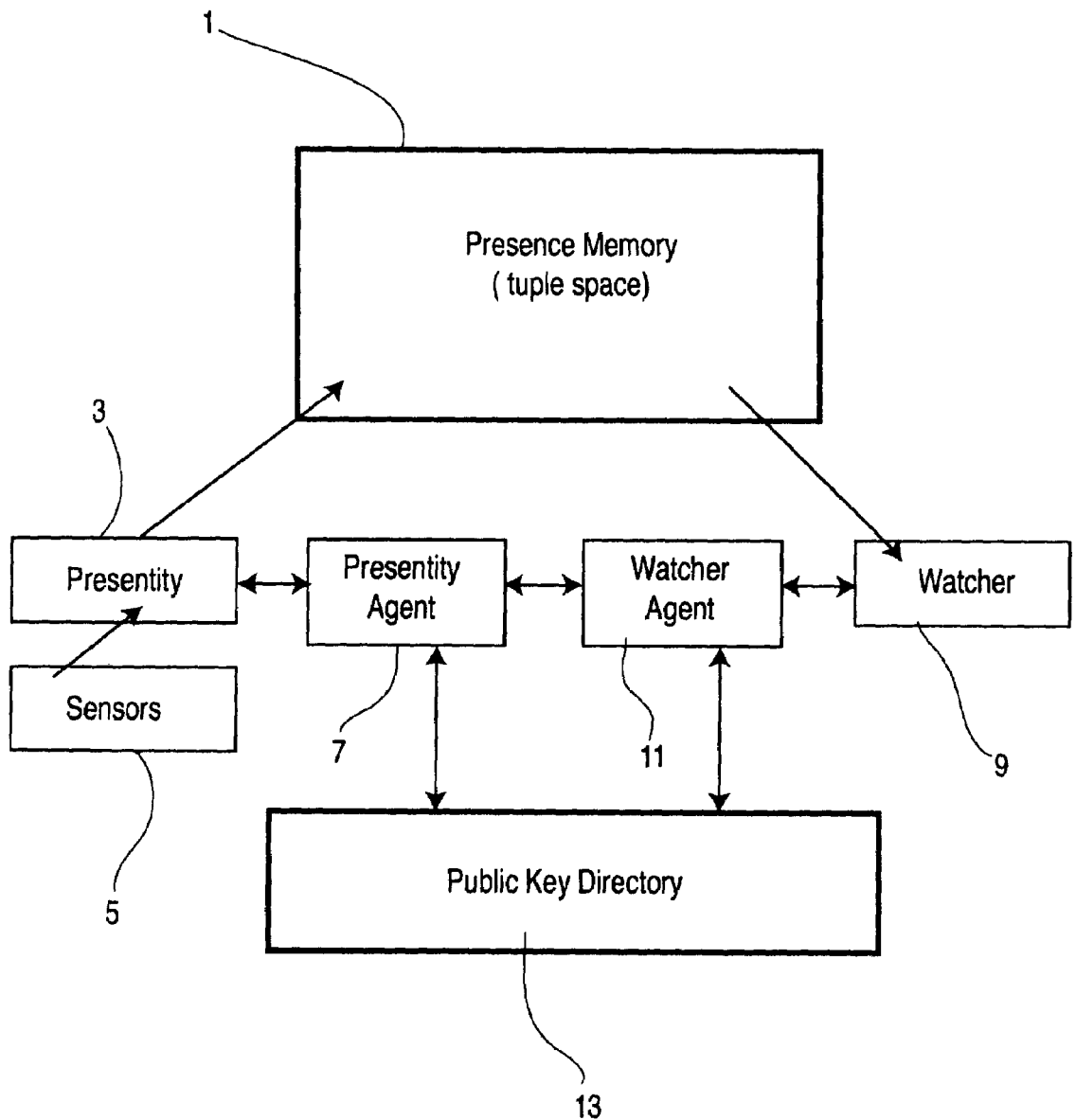
FIG. 1, is a block diagram of a privacy and security mechanism for a presence system using tuple spaces in accordance with the present invention.
Figure 2:
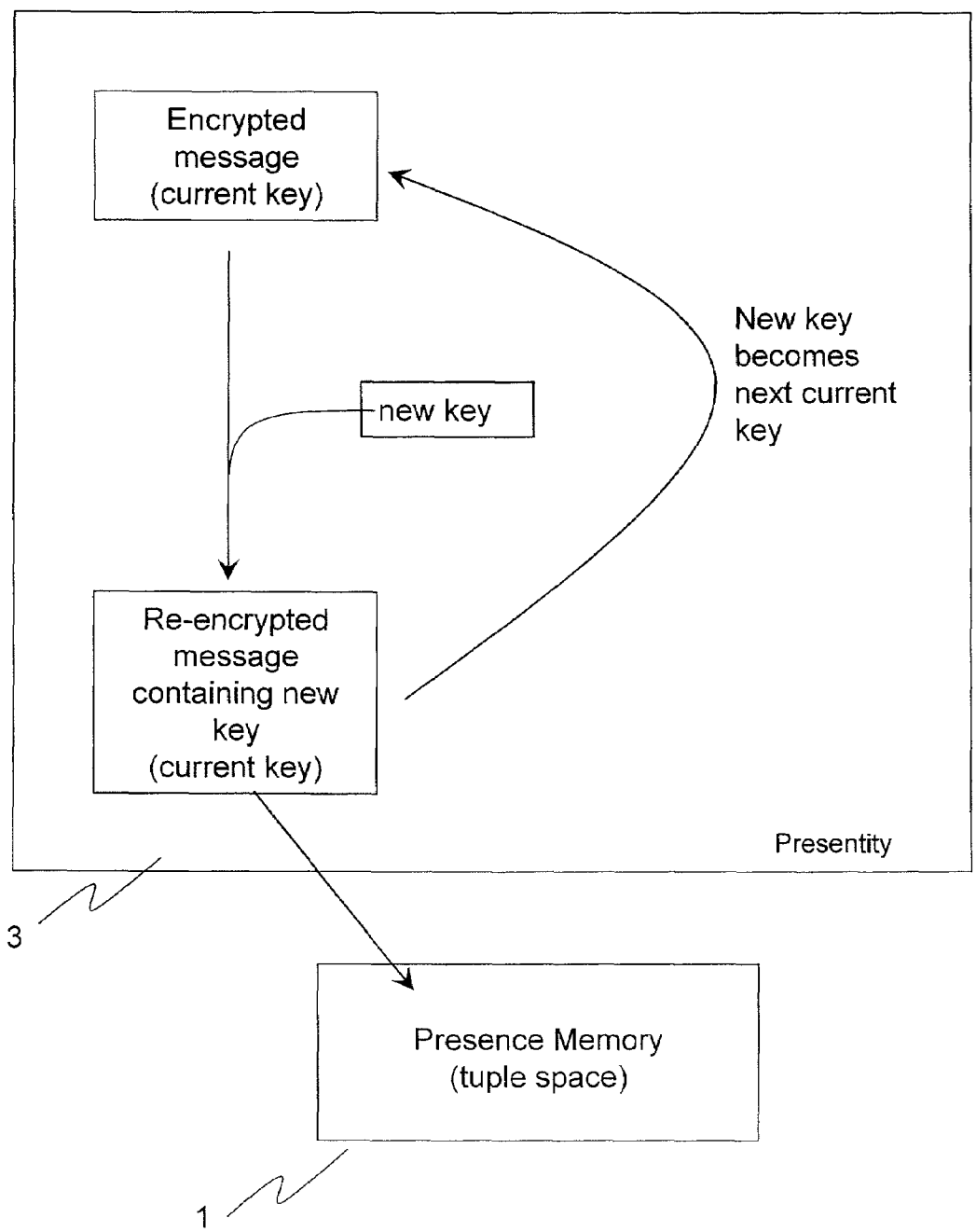
FIG. 2 is a block diagram of the presentity generating a new cycling key.

FIG. 1 shows the system according to the present invention. Presence memory 1 (i.e. tuple space) stores the presence tuples which contain indications of the availability or non-availability of external entities (i.e. persons or devices). It will be understood by a person of ordinary skill in the art that all references to tuple space or presence memory in this specification include any suitable shared information space (for example Java space, etc.) A presentity 3 is the entity that is connected to the external indicators of an entity's presence. It collects evidence from external sensors 5 and/or from control information sent by the represented entity, and uses this information and some internal polices to determine the entity's availability and other parameters that indicate its presence. The exact operation of presentity 3 is not pertinent to this disclosure beyond the fact that it stores presence information in an encrypted manner to prevent unauthorized access.

Presentity agent 7 is associated with the presentity 3 of an entity and controls access to the presence information. Since this information is encrypted, other entities desiring access to the information must undergo a process of mutual authentication and authorization with the presentity agent 7.

Watcher 9 monitors the presence of an entity for another entity by entering into a cycling encryption protocol, decrypting the received presence information and making this available to the watching entity. Although only one watcher 9 is shown, any number of watchers may be provided for an identical number of subscriptions to presence information by an entity.

Watcher agent 11 manages the subscriptions to presence information for a specific entity. One watcher agent 11 is provided per entity. The watcher agent 11, under direction of the entity, enters into the subscription negotiation for mutual authentication and authorization with the appropriate presentity agent 7.

Public key directory 13 is a directory in which the unique public encryption keys of all watcher agents 11 and presentity agents 7 are kept.

Communication between components in this system is accomplished via messaging, as described in greater detail below.

First, all entities are provided with unique identifiers for addressing within the system. For example, identifiers may be in the form of URIs (universal resource indicators) in the form of Email addresses. Thus, an example of a unique identifier for the entity (that is person) John Doe whose email address is John_Doe@example.com would be John_Doe.example.

com. The Internet naming process ensures that these names are unique and their use in standard operation is security against spoofing.

Unique names for other components in the systems associated with an entity may be derived using the familiar dot notation. For example:

| | |
|---|---|
| Watcher Agent | wa.John_Doe.example.com |
| Presentity Agent | pa.John_Doe.example.com |
| Presentity | p.John_Doe.example.com |

Watchers 9 require more information since a single watcher will be associated with every subscription between a pair of entities. For the example of a subscription for Richard Roe whose unique name is Richard_Roe.acme.com by John Doe whose unique name is John_Doe.example.com, the watcher 9 is w.Richard_Roe.acme.com.John_Doe.example.com or w.{Presentity Unique Name}.{Watcher Unique Name}

As indicated above, communication between components is via messages exchanged in the tuple space 1 by publishing and subscribing to information, as is well known in the art.

Messages used by components in this disclosure are in tuples of the format:

| | |
|---|---|
| <MESSAGE> | <Message Sequence Number> |
| <TO> | <Unique Name of Receiving Component> |
| <FROM> | <Unique Name of Sending Component> |
| <OPERATOR> | <Operator Function Code> |
| <SECURITY> | <Encypted Unique Name of sender concatenated with a random word where double encryption is used in accordance with standard public key signatures for mutual authentication and authorization> |
| <PARAMEMTERS> | <Optional Tuple Containing Parameters Pertinent to the Operator> |

Operator>

The messages used in implementing this invention include, where the operator '+' represents concatenation:

Subscribe

This message indicates the desire of a watcher agent 11 to subscribe to the presence information of a presentity 3. As is well known in the art of tuple spaces, in order for the presentity 3 to receive the SUBSCRIBE message, it must first publish an anti-tuple to the shared space 1 with a "?" in the <FROM> field. Preferably, a state machine, as is known in the art performs communication protocol tasks over the tuple space. The SUBSCRIBE tuple is of the form:

| | |
|---|---|
| <MESSAGE> | <Message Sequence Number> |
| <TO> | <Unique Name of Presentity Agent> |
| <FROM> | <Unique Name of Watcher Agent> |
| <OPERATOR> | <SUBSCRIBE> |
| <SECURITY> | <$E_{priv.watcher}\{E_{pub.presentity}\{$Unique name of watcher agent + random$\}\}$> |

In this specification, the conventional "E" notation is used before the name of the key used for encryption. Thus, $E_{priv.watcher}$ expresses the operation of encryption with the private key of the watcher.

Subscribe_Reply

This message is returned as part of the subscription negotiation process from the presentity agent 7 to a watcher agent 11 which has sent a SUBSCRIBE method to start the process. It indicates whether or not the subscription request has been accepted and the indication of the first cycling key that can be used. The SUBSCRIBE_REPLY message is of the form:

| | |
|---|---|
| <MESSAGE> | <Message Sequence Number> |
| <TO> | <Unique Name of Watcher Agent> |
| <FROM> | <Unique Name of Presentity Agent> |
| <OPERATOR> | <SUBSCRIBE_REPLY> |
| <SECURITY> | <$E_{priv.presentity}\{E_{pub.watcher}\{$Unique name of Watcher Agent + Random$\}\}$> |
| <KEY> | <$E_{priv.presentity}\{E_{pub.watcher}\{$First Cycling Key$>\}\}$ |
| <IDENT_KEY> | <$E_{priv.presentity}$ {Unique Name of Presentity Agent + Random }> |

As described in greater detail below, the <IDENT_KEY> is used to create a hidden unique identifier that can be verified as coming only from the presentity agent 7. Since only the presentity agent knows its private key, only it can create this key. The use of a random string concatenated with the unique id protects this identifier key from replay attacks. It will be appreciated that there are many other ways that this can be accomplished. One that has been used for digital cash is to encrypt a highly recognizable number. For example if the number has a palindromic binary representation then it will be very difficult for an attacker to guess a key that is the encrypted representation of it and it would be very easy for the intended receiver to verify authenticity and thus prevent spoofing. Thus, a random binary number of sufficient length may be generated, followed by generation of a palindromic number by appending a reversed representation of the binary number with itself (for example for the four-bit randomly generated number 1011, its corresponding palindromic number is 10111101). Such a number has unique properties that can be used to identify a particular sender yet, with encryption, would be very difficult for an attacker to guess.

Desubscribe

This message indicates the desire of watcher agent 11 to remove a subscription to a presentity 3. This message does not physically remove the subscription but indicates to the presentity agent 7 that it can remove the watcher agent 11 from its internal lists of authorized watchers. The DESUBSCRIBE message is of the form:

| | |
|---|---|
| <MESSAGE> | <Message Sequence Number> |
| <TO> | <Unique Name of Presentity> |
| <FROM> | <Unique Name of Watcher> |
| <OPERATOR> | <UNSUBSCRIBE> |
| <SECURITY> | <$E_{priv.watcher}\{E_{pub.presentity}\{$Unique name of Watcher + Random$\}\}$ |

Forced_Desubscribe

This message is sent from the presentity agent 7 to the subscribed watcher agents 11 to inform them that their subscription to presence information has been removed. This message is of the form:

| | |
|---|---|
| <MESSAGE> | <Message Sequence Number> |
| <TO> | <Unique Name of Watcher Agent> |

-continued

| | |
|---|---|
| <FROM> | <Unique Name of Presentity Agent> |
| <OPERATOR> | <FORCED_DESUBSCRIBE> |
| <SECURITY> | <$E_{priv.presentity}\{E_{pub.watcher}\{$Unique Name of Watcher Agent + Random$\}\}$> |

Since presence information is of a sensitive nature, there will be times when the subscription of a malicious user will be terminated involuntarily. In this case the sharing of the cycling key information with all subscribers in the normal manner (as described later) will have to be terminated. This is accomplished as noted below by removing all current subscriptions and the setting up of a new site of presence information in the presence memory. All subscribers are then notified of this and in response initiate re-subscriptions. The malicious subscriber need not be notified and the breached presence location may be maintained if desired conveying spurious information.

This message may also be used as an acknowledgement of a requested de-subscription.

The basic format of presence information may be changed according to user needs and in response to system evolution. However for this disclosure presence information is restricted to the single field that contains availability information. The other fields in the tuple, specifically IDENT_KEY, TOGGLE, NEXT_KEY, are keys used specifically to provide the privacy and security protection offered by the invention set forth in this disclosure.

Presence information is published or poked to the tuple space 1 by a presentity 3 in the form of a tuple:

| | |
|---|---|
| <IDENT_KEY> | <$E_{priv.presentity}\{$Unique Name of Presentity Agent + Random$\}$:> |
| <TOGGLE> | <One of two or more unique values known to senders and receivers that will be used to indicate a newly entered tuple> |
| <Availability> | <$E_{CURRENT\_CYCLING\_KEY}\{$Available or Non-Available$\}$> |
| <Next Key> | <$E_{CURRENT\_CYCLING\_KEY}\{$Next_Cycling_Key$\}$) |

Subscription information is protected according to the present invention using the well-known public key system. This provides for the capability of mutual authentication in the negotiation system and in the operation of the presence tuples, notably the IDENT_KEY that may be used to provide opaque multiple presence sites, as discussed in greater detail below.

The same public key system is used in the well-known way to insure that only a particular agent (i.e. watcher 9 or presentity 3) can create a specific value in a presence tuple or message, thereby providing user authentication. It also addresses the issue of non-repudiation of presence tuples and the prevention of presence tuple spoofing in a well-known way.

It will be appreciated by a person of skill in the art that the use of public key directory 13 implies that public keys are available for all presentity agents 7 and watcher agents 11, which may be accessed using their unique identities. The directory 13 is used to the retrieve these public keys.

The cycling key system of the present invention addresses the problem that presence information can be observed in the outside world and consists of only a few values. Because of this paucity of unique values, even an encrypted presence value can reasonably be guessed because it changes slowly between only a small number of values. A malicious observer could observe an entity's behavior surreptitiously in the real world, guess its availability and watch the presence memory 1 for a presence tuple that is changing in synchrony with this observed behavior. The fact that the presence information is encrypted is not a hindrance to such a malicious watcher 9 since it would have only a few discrete values which, encrypted or not, serve as markers for presence.

To overcome this security flaw, the system of the present invention uses cycling keys generated by a presentity 3 to its authorized watchers 9 in the presence tuple and in the SUBSCRIBE_REPLY message.

The cycling key is a shared secret key that performs encryption by simply XORing with the target value.

An example of the method of operation of the present invention will now be described.

Subscription negotiation begins with a watcher agent 11 sending a SUBSCRIBE message to the agent 7 of the desired presentity 3. The presentity agent 7 considers the request and replies with a SUBSCRIBE_REPLY message which contains the site to be used for storing presence information for a predetermined desired degree of privacy protection and an encrypted value of the first cycling key to be expected.

Upon receipt of the SUBSCRIBE_REPLY message, the watcher agent 11 creates a watcher 9 to handle the subscription. The watcher 9 subscribes to the indicated site and waits for the first presence tuple to be poked.

In this process the presentity agent 7 waits a reasonable amount of time (for example a few hundredths of a second) after sending a presence tuple before issuing a new tuple with the cycling key that it has given to the watcher agent 11 in the SUBSCIBE_REPLY message.

The watcher 9 receives this tuple and enters into the cycling key process described below.

However, in the event that the watcher 9 does not receive an initial tuple with the expected cycling key, it will detect invalid values when it decrypts the availability information. It then knows that it is out of sequence with the cycling key and in response requests synchronization by de-subscribing and re-subscribing.

The authorized watchers 9 subscribe to the presence site by issuing a subscription for the value of the IDENT KEY field that they have been given in the subscription process. At random intervals, the presentity 3 generates a new cycling key and provides it to the watchers 9 within the presence tuple. In particular, the presentity takes the current cycling key (i.e. the value it last generated and shared as a cycling key) and encrypts the presence (availability) information with it. The presentity 3 also encrypts the new cycling key with the current cycling key and then publishes this information as a tuple to the presence memory 1 for publication to all authorized watchers. The authorized watchers 9 then use the received key to decrypt both the availability information and the new key. The new key is then stored for use on the next presence tuple and the availability is used for whatever purpose needed.

In the event that the presence information changes (that is the user moves locations), the same procedure takes place. A new cycling key is generated, and a presence tuple with the new presence information is generated in the same manner as described above. Thus, changes in presence information are indistinguishable from random cycling key changes to a malicious watcher.

It is possible in some circumstances for a presence tuple to be missed with the result that a watcher 9 loses synchronization with the cycling key. In such a case, the watcher 9 will recognize that this is the case by seeing invalid values when it decrypts the presence information. In response, the watcher 9 notifies the watcher agent 11 of the problem. The watcher agent 11 then obtains resynchronization by de-subscribing and re-subscribing to the presentity 3 to obtain a valid cycling key through subscription negotiation.

Some important applications are possible resulting from the publishing of and subscription to presence tuples according to the system of the present invention.

Site of Presence Tuple

Presence information is shared by watchers 9 subscribing to tuples published by the presentities 3. The IDENT_KEY field is the prime field used for the subscription. Informally, this can be considered to be a location within the presence memory 1 and therefore is referred to herein as the site of the presence tuple. Since this field is opaque, it allows a presentity 3 to have many sites of presence information without an unauthorized watcher 9 being aware of it. This ability for opaqueness and multiple sites has many uses, which are detailed as follows:

Prevention of Spoofing of Presence Tuple by Malicious Publisher

To prevent malicious users from entering false information into the system that would falsely represent an entity's presence, the IDENT_KEY is created as a secret value by each presentity 3. As discussed above the presentity 3 creates this value by encoding its unique id with a random value. This creates a value that is very difficult for an attacker to guess.

Ensuring that a Tuple is from a Valid Publisher

Although an attacker will experience difficulty in trying to guess the IDENT_KEY value, a valid watcher 9 can confirm that a valid presentity 3 has created an IDENT_KEY by decoding it with the presentity's public key and observing the presentity's unique id within it.

Spoofing Presence to Deter Malicious and Undesired Watchers

The creation of an opaque site for the presence tuple also permits identification of malicious and undesired watchers by the creation of spoofing presence tuples. An example is when a subscription request arrives from an entity that a presentity 3 does not wish to have observe its presence. Circumstances may be such that a refusal to supply presence information would be impolite or politically unwise. In such a circumstance, the presentity 3 creates a spoofing site in which it can place false presence information. The presence negotiation is carried out normally as set forth above except that the undesired watcher 9 is provided with a site in which the presentity 3 can place false information that could appear to be reasonable.

In a similar manner as above, a presentity 3 may at times wish to rid itself of an undesired watcher 9 without the political problems incurred by forcing it to de-subscribe. This can be accomplished by de-subscribing all of its watchers except the undesired one. The de-subscribed watchers can then immediately re-subscribe and are directed to a newly created site. The undesired watcher remains at the previous site where it can be given false information.

Each of the above scenarios is analogous to trapping as used in the telephony case of trapping a malicious or obscene caller by causing the system to ignore his requests of disconnect by hanging up. However, according to the present invention trapping is done by subterfuge. The malicious watcher will be unaware of the action taken against it.

Various Levels of Privacy

The strategy of using opaque sites for presence information also allows for a presentity 3 to have multiple sites with presence information. As indicated above, this can be used to foil undesired watchers 9. However it can also be used to provide different grades of presence information to various classes of watchers. Thus an entity can graduate the amount of private information it wishes to share with various classes of watchers such as work colleagues, personal friends, family and so on.

Modifications and variations of the invention are possible. All such modifications and variations are believed to be within the sphere and scope of the invention as defined by the claims appended hereto.

The invention claimed is:

1. A communication system for privately and securely exchanging information about a first entity with at least one further entity, comprising:
   a presence memory to store tuples that contain said information;
   a presentity to publish encrypted information about said first entity to said presence memory, wherein said information comprises a unique identifier of said presentity, said unique identifier comprising a random string concatenated to an identifier key, and wherein said presentity is enabled to:
     encrypt said information with a unique key provided by said presentity to create said encrypted information;
     post said encrypted information to said presence memory;
     change said unique key to a new unique key at random intervals;
     re-encrypt said encrypted information with said new unique key to create re-encrypted information; and
     re-post said re-encrypted information to said presence memory at said random intervals, and wherein said re-encrypt and said re-post are repeated when presence information changes in presence information comprising changes in location of a user;
   sensors for detecting presence of the first entity, said presentity connected to said sensors;
   a watcher agent associated with said at least one further entity to post a subscribe tuple to said presence memory to initiate a subscription to said information published by said presentity via said post and said re-post;
   a presentity agent associated with said first entity to return subscribe-reply messages, a first subscribe-reply message containing said unique key to subscribe said further entity to said encrypted information published by said presentity, and a second subscribe-reply message containing said new unique key to subscribe said further entity to said re-encrypted information published by said presentity; and
   a watcher associated with said further entity to monitor said presence memory and decrypt said encrypted information and said re-encrypted information using said encryption key and said new unique key, respectively, and provide said information to said further entity.

2. The system of claim 1, wherein said unique identifier further comprises a palindromic binary representation associated with a sender of said messages.

* * * * *